United States Patent [19]

Christ et al.

[11] 4,422,318

[45] Dec. 27, 1983

[54] ROLLER WITH A ROLLER SURFACE WHICH IS TO BE HEATED OR COOLED

[75] Inventors: Alfred Christ, Zurich; Rolf Lehmann, Rudolfstetten; Beat Schlatter, Mutschellen, all of Switzerland

[73] Assignee: Escher Wyss Limited, Zurich, Switzerland

[21] Appl. No.: 226,540

[22] Filed: Jan. 19, 1981

[30] Foreign Application Priority Data

Jan. 25, 1980 [CH] Switzerland ............................ 603/80

[51] Int. Cl.³ .......................................... B21B 27/06
[52] U.S. Cl. ...................................... 72/200; 72/201; 72/236
[58] Field of Search ................. 72/200, 201, 202, 236, 72/342, 364; 165/89

[56] References Cited

U.S. PATENT DOCUMENTS

| | | | |
|---|---|---|---|
| 737,571 | 9/1903 | Bray | 72/201 |
| 1,936,582 | 11/1933 | Clapp et al. | 72/200 X |
| 2,107,541 | 2/1938 | Long | 72/236 |
| 3,192,757 | 7/1965 | Diolot | 72/236 |
| 3,357,224 | 12/1967 | Muller | 72/201 |
| 3,540,527 | 11/1970 | Grenfell et al. | 72/201 |
| 3,994,151 | 11/1976 | Stock et al. | 72/201 |
| 4,226,108 | 10/1980 | Wilmotte et al. | 72/201 |

FOREIGN PATENT DOCUMENTS

| | | | |
|---|---|---|---|
| 1924319 | 11/1970 | Fed. Rep. of Germany | 72/201 |
| 2031967 | 11/1970 | France | 72/201 |
| 37-69 | 1/1962 | Japan | 72/201 |

*Primary Examiner*—Ervin M. Combs
*Attorney, Agent, or Firm*—Robert A. Ostmann

[57] ABSTRACT

A roller is shown having an apparatus for cooling or heating the roller surface. The apparatus has essentially one or more chambers which are open relative to the roller surface. The chambers have a substantially square internal cross section. A fluid is fed in through the inlet ducts. During operation of the roller turbulence is formed in the chambers. The turbulence results in a longer retention time for the fluid in the chambers thus producing a greater cooling or heating effect for the amount of fluid fed in.

19 Claims, 11 Drawing Figures

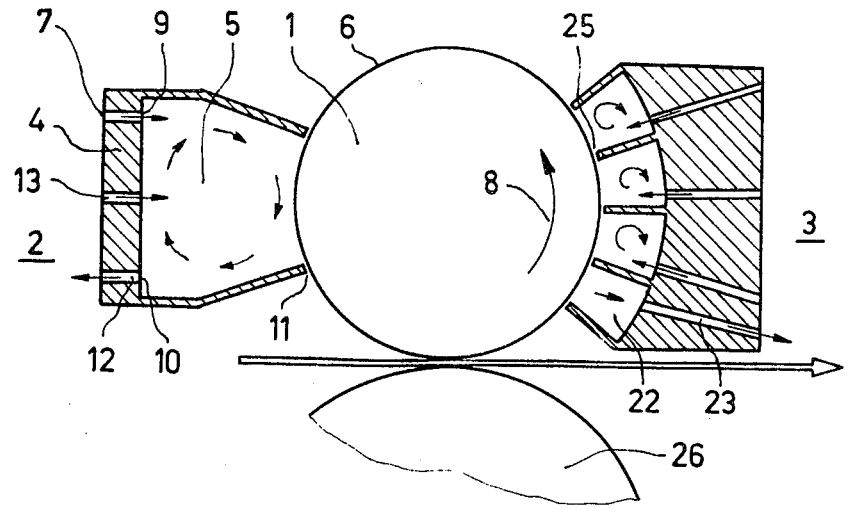
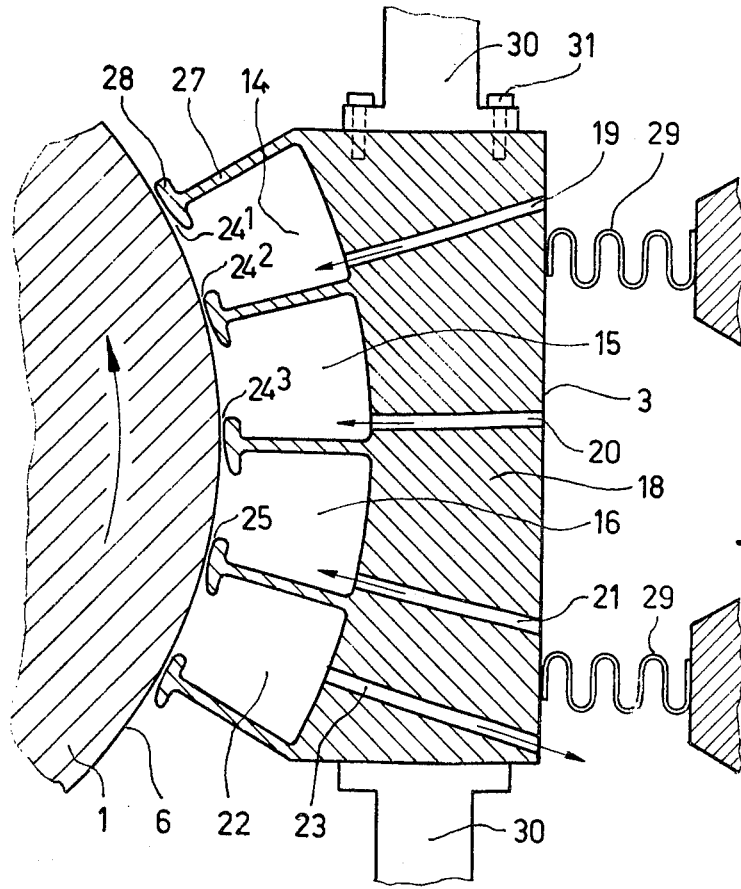
Fig. 1
Fig. 2

ROLLER WITH A ROLLER SURFACE WHICH IS TO BE HEATED OR COOLED

BACKGROUND OF THE INVENTION

The invention relates to a roller with a roller surface which is to be heated or cooled by means of a fluid, having a heat exchange apparatus comprising at least one chamber for the fluid which is adjacent to the roller surface and is open relative to said roller surface, the surfaces of the chamber walls which face the roller surface forming a gap with the roller surface, and having a fluid supply for the chamber and having clamping means for clamping the chamber in the circumferential direction of the roller.

A roller of this kind is known from U.S. Pat. No. 4,149,397, for example. According to this specification, the roller surfaces of the working rollers are thermally affected by means of external hydrostatic support means. The pressure medium of the hydrostatic support means, which is used as the coolant in this specification, is fed via choke bores to hydrostatic, chamber-like bearing pockets which are open relative to the roller surface which is to be cooled, and it flows out of said bearing pockets through the gap between the end faces of the chamber walls and the roller surface, forming a substantially constant hydrostatic film of coolant, and there is a particularly good heat transfer in the gap chamber, compared with the amount of coolant required.

This known arrangement is highly sensitive to the slightest pressure fluctuations in the pressure medium or coolant fed in. Thus, for example, any soiling or even blockage of the choke inlets will have enormous influence on the cooling effect. Moreover, the temperature variation in the pressure medium supplied, en route from the pressure medium source to the place or heat release at the roller surface, is so great that it is almost impossible to calculate in advance the desired final temperature of the pressure medium which releases its heat at the roller surface.

Other known arrangements in which coolants or heating media are sprayed on to the roller surface or the inner wall of a roller shell are known from CH-PS No. 577,598, FIG. 4 or U.S. Pat. No. 885,283, for example. The method of influencing the heat of rollers known from these specifications is widely used and is totally unaffected by pressure fluctuations in the pressure medium or heat exchange medium supplied. However, in all constructions of this type, large quantities of pressure medium have to be fed in, requiring pumping capacities which are disproportinately large in relation to the efficiency obtained, particularly when the heat exchange medium is at fairly high temperatures. Moreover, the elimination or recycling of the heat exchange medium causes problems when such large amounts are involved.

SUMMARY OF THE INVENTION

The aim of the invention is to provide an inexpensive heat exchange apparatus which can be used with any roller having a surface which is to be heated or cooled, which apparatus is relatively insensitive to pressure fluctuations and also required little pumping capacity even for high efficiency.

This aim is achieved according to the invention, in a roller with a heat exchange apparatus having at least one chamber, in that, in order to create turbulence, the chamber, being cross cut to the roller axis, has a substantially square internal cross section, in which chamber, in order to promote the turbulence, the mouth of the fluid inlet duct is located in front in the direction of movement of the roller surface of the main outlet ports of the fluid discharge means, and in that the pressure in the chamber is less than 5 bar and in that the total drop in pressure in the fluid inlet duct is less than 5 bar.

It is particularly advantageous if these surfaces of the chamber walls facing the roller are supported on the roller surface via a hydrodynamic film of lubricant as the roller rotates. A good, reliable construction is obtained by providing the chamber walls with hydrodynamically shaped ends.

In smaller constructions, it is advantageous if the entire chamber is pressed radially against the roller surface by means of pre-stressed elastic means, whereas, in larger constructions of the chamber according to the invention, the hydrodymamically shaped shoes are preferably movable radially relative to the roller axis by means of elastic components and/or by the elasticity of the chamber walls.

In rollers with highly elastic roller surfaces, a particularly simple construction can be obtained by rigidly fixing the chamber in both the circumferential and radial directions by the use of clamping means.

BRIEF DESCRIPTION OF THE DRAWING

The drawings, which are intended to illustrate the invention, show simplified representations of exemplary embodiments of the object of the invention. In the drawings:

FIG. 1 shows a cross section through a roller with two different embodiments of the heat exchange apparatus according to the invention, FIG. 2 shows a cross section through the embodiment of a heat exchange apparatus according to the invention shown on the right in FIG. 1.

In the embodiments which follow, like parts have been given the same reference numerals.

DESCRIPTION OF THE PREFERRED EMBODIMENT

Figure 3:
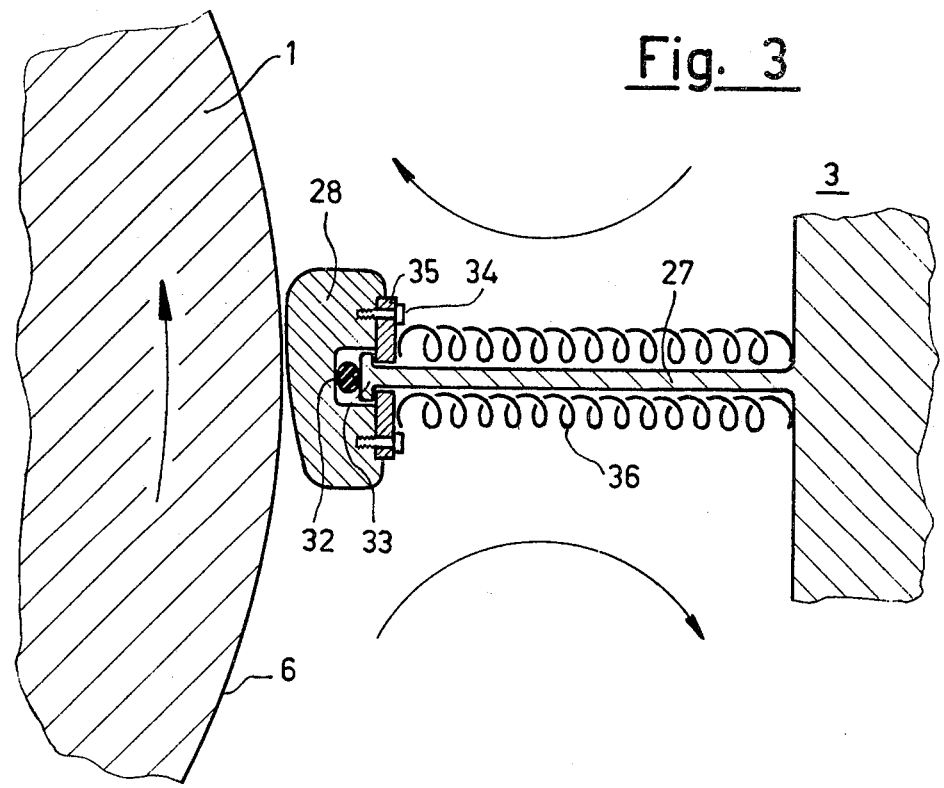
FIG. 3 shows a cross section through one of the chamber walls which form the chambers in the heat exchange apparatus according to FIG. 2.

FIGS. 1 to 5 show a roller 1 with heat exchange apparatus 2 and 3. The heat exchange apparatus 2, shown on the left in FIG. 1, consists of a ledge 4 extending parallel to the roller axis and carrying a chamber 5. The chamber 5 has a side which is open towards the roller surface 6 which is to be heated or cooled. The ledge 4 carrying the chamber 5 is mounted laterally on the roller 1 in such a way that the side walls of the chamber 5 and the surface 6 of the roller form a gap. An inlet duct 7 is provided in the ledge 4. The fluid provided as the heat exchange medium is fed into the chamber 5 through this inlet duct 7.

In operation, the roller surface 6 of the roller 1 rotates, for example, in the direction indicated by the arrow 8. The rotating roller surface 6 imparts, to the fluid located in the chamber 5 near the roller surface 6, an acceleration which causes turbulence in the chamber, owing to the substantially square internal cross section of the chamber 5. The substantially square internal cross section of the chamber, which is essential to the present invention, refers to the substantially equal dimensions of the inside of the chamber in both the radial and circumferential directions of the roller 1.

In the direction of rotation of the roller indicated by the arrow 8 in FIG. 1, the mouth 9 of the fluid inlet duct 7 is located in front of the outlet point 10 of the fluid discharge means 12 seen in the direction of movement of the roller surface 6. This turbulence is additionally promoted by the stream of fluid entering through the inlet duct 7. In order to avoid subjecting the chamber 5 and the fluid inlet duct 7 to unfavourable pressures, the pressure in the chamber 5 is less than 5 bar. The overall drop in pressure in the fluid inlet duct 7 is less than 5 bar in order to restrict the fluid conveying power of the pump to a technically reasonable level.

The turbulence makes it possible for the fluid supplied to have a longer retention time in the chamber 5. As a result, a greater heat exchange for the amount of fluid fed in can be achieved. Thus, in the case of rolling metal, for example, the fluid supplied as a coolant can take more heat away from the hot roller surface 6 thanks to the longer retention time in the chamber. Conversely, if the roller surface 6 is to be heated, e.g. in the thermal setting of non-woven materials, the longer retention time made possible by turbulence means that the fluid used as a heat transporting medium can give off more heat to the roller surface 6.

In the heat exchange apparatus 2 having a single chamber 5, shown on the left in FIG. 1, the outlet duct 12 serves to discharge the fluid, as already mentioned. Another portion of the fluid is discharged through the gap at the outlet point 11. For controlling the amount of fluid to be discharged from the chamber 5, the cross section of the outlet duct 12 may, for example, be enlarged or made smaller by means of suitably mounted shutters (not shown in FIG. 1). In addition, a pump may be connected to the discharge duct 12 to suck out the excess fluid located in the turbulence chamber 5.

An inlet duct 13 for a gaseous fluid serves to influence the turbulence in the chamber 5 without affecting the quantity of fluid in the form of a liquid. With an additional inlet duct 13 of this kind, two-phase cooling can be obtained, for example. A mixture of air and roller oil may preferably be used for cooling metal rollers, the air entering through the inlet duct 13 whilst the roller oil, used in the form of a liquid, enters through the inlet duct 7. The advantages of a two-phase current cooling system of this kind are: that there is no build-up of pressure in the chamber 5, since, when two phases are used, the chamber 5 can be filled mainly with the gaseous phase, i.e. air, and the cooling effect can be metered finely by means of the ratio of the liquid and gaseous phase to each other.

The heat exchange apparatus 3 on the right in FIG. 1 has a plurality of chambers 14, 15, 16 all of which are secured to a ledge 18. The chambers 14, 15, 16 must also each have a substantially square cross section so as to guarantee satisfactory turbulence of the fluid in question. Advantageously, the chambers 14, 15, 16 are supplied through individual fluid inlet ducts 19, 20, 21.

Since, in many practical instances, e.g. in the case of metal rollers, the material rolled between the roller 1 and counter-roller 26 will not generally tolerate any soiling with fluid, in the embodiment shown on the right in FIG. 1 a special suction chamber 22 with a suction duct 23 serves to suck away any fluid emerging from the chambers 14, 15, 16 through the outlet points $24^2$, $24^3$, 25. For this purpose, the pressure in a suction chamber 22 of this kind is kept permanently below atmospheric pressure during operation. The fluid emerging through the outlet point $24^1$ is prevented by the rotating roller 1 from flowing back into the chamber 14. In the embodiment shown on the right in FIG. 1, each chamber is supplied individually.

FIGS. 2 and 3 show further details of a heat exchange apparatus of the type shown on the right in FIG. 1.

As can be seen from FIGS. 2 and 3, the chamber walls 27 are provided with hydrodynamicaly shaped shoes 28. If the roller 1 has a rigid roller surface 6, the entire heat exchange apparatus 3, as shown in FIG. 2, can be pressed radially against the roller surface 6 by prestressed elastic means 29. Clamping in the circumferential direction is assured by clamping means 30. The prestressed elastic means 29 and the clamping means 30 ensure that the chambers 14, 15, 16 and the suction chamber 22 adapt to any changes in position of the rigid roller surface 6.

The chambers 14, 15, 16 and the suction chamber 22 may also be secured by the clamping means 30 both in the circumferential and in the radial directions, for example by screws 31, as indicated in FIG. 2. However, at least in the case of a roller 1 with a rigid roller surface 6, it is then necessary to ensure that the hydrodynamicaly shaped shoes 28 are radially movable relative to the roller surface 6, by providing other elastic parts. As shown in FIG. 3, this mobility can be obtained by placing an elastic member 32 in a recess in the shoe 28, the enlarged ends 33 of the chamber walls 27 being supported on said elastic member 32 and the chamber walls being prevented from moving out of the shoe 28 by means of screws 34 and matching components 35. A prestressing force which presses the shoe 28 against the roller surface 6 is provided by means of a spring 36 in FIG. 3. Simply the elastic flexibility of the chamber walls may possibly be sufficient to give the shoes 28 the radial mobility described above.

In the case of highly elastic roller surfaces 6, the heat exchange apparatus may also be clamped in both the circumferential and radial directions of the roller 1 without any elastic flexibility, with the chamber walls just failing to make contact with the surface 6 of the roller. However, in this case, the heat exchange apparatus has to be at a precise spacing from the roller 1. In fact, as soon as the gap between the roller surface 6 and a chamber wall becomes too large, the chamber pressure becomes too low at this point. The result of this is that the fluid which has just left the chamber runs back into the chamber, often resulting in a temperature which differs from the desired temperature at this point.

Figure 4:
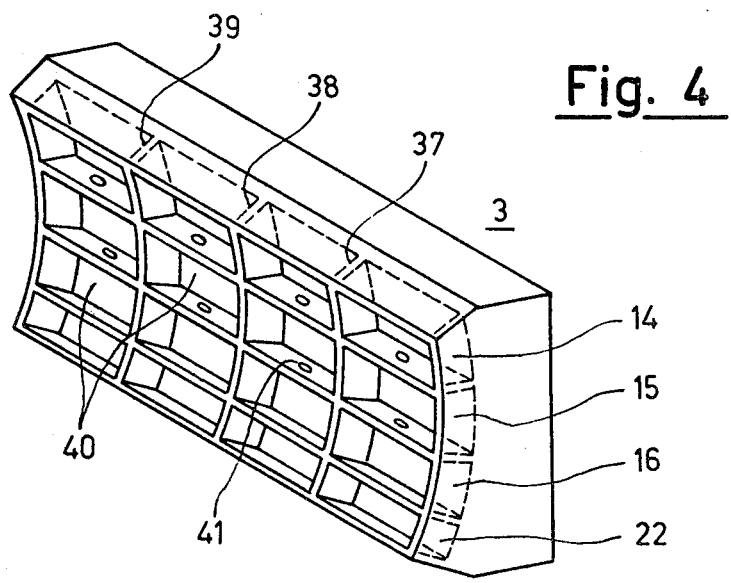
FIG. 4 shows and inclined elevational view of the embodiment of the heat exchange apparatus as shown in cross section on the right hand side of FIG. 1.

As shown by FIG. 4, the chambers 14, 15, 16 and the suction chamber 22 may also be subdivided by partitions 37, 38, 39. The chambers 14, 15, 16 and the suction chamber 22 are thereby divided into compartments 40 in the axial direction of the roller. The compartments can be individually acted upon with fluid via additional individual inlet and outlet ducts. In this way, the cooling or heating effect can be controlled over the width of the roller, i.e. in the direction of the roller axis. The feed pressure is advantageously maintained by means of a volumetric feed pump which is coupled directly to the roller drive. This means that the quantity of fluid fed in increases or decreases in accordance with the roller speed or the speed of rotation of the roller 1. The provision of valves on these inlet and outlet ducts makes it possible for individual zones distributed over the roller axis to be cooled and/or heated to different degrees or not cooled and/or heated at all. The compartments 40 are interconnected by means of throughflow openings 41 for the fluid which are of variable cross section. These throughflow openings make it possible to reduce the number of inlet ducts to the individual chambers 14, 15, 16 in the circumferential direction of the roller 1.

Figure 5:
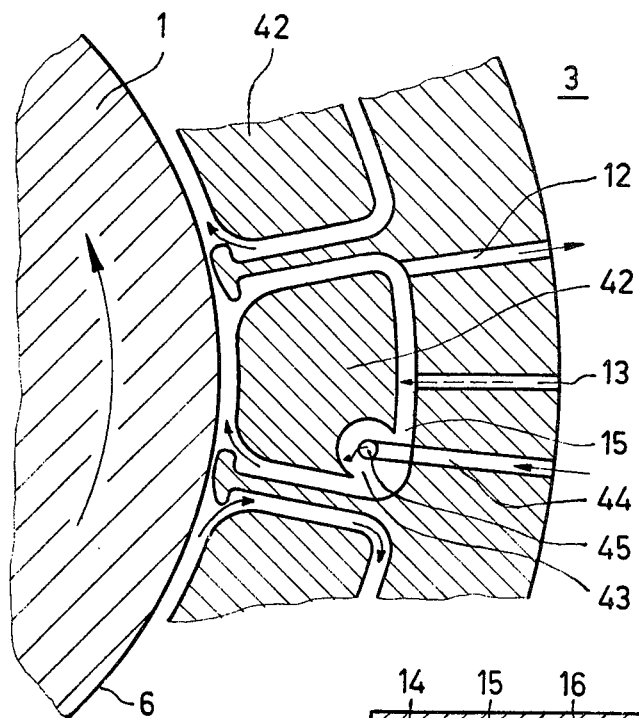
FIG. 5 shows a cross section through a roller with another embodiment of a heat exchange apparatus according to the invention.

The alternative embodiment of a heat exchange apparatus 3 shown in FIG. 5 contains a displacement member 42 in each chamber. The displacement member 42 may comprise a circular recess 45 at a suitable point, into which the fluid is fed through the inlet ducts 44, for example. With a fluid supply of this kind, an intake of fluid which spreads out uniformly in the axial direction of the roller can be obtained. As shown in FIG. 5, the fluid flows through the inlet duct 44 which leads into the centre of the circular recess 43. Coming out of the mouth 45 of the inlet duct 44 which is in the centre of the recess 43, the fluid does not leave the recess 43 until it has spread round inside the recess 43. This results in the above mentioned distribution of the fluid fed in in the axial direction of the roller over the entire width of the chamber.

Figure 6:
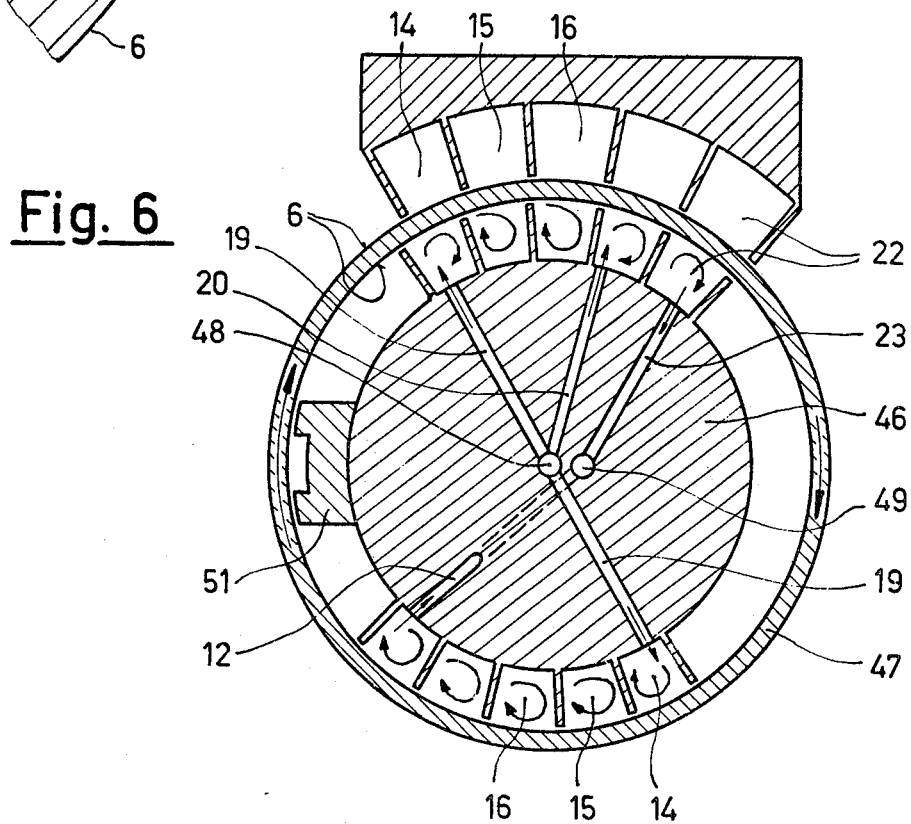
FIG. 6 shows a cross section through a deflection-compensating roller with schematic examples of heat exchange apparatus according to the invention inside and outside the roller.

FIG. 6 illustrates the invention for use with a deflection-compensating roller. In the example shown in FIG. 6, the deflection-compensating roller consists of a fixed yoke 46 and a roller shell 47 rotating about the yoke 46, with an inner and an outer roller surface 6. Heat exchange apparatus according to the invention are mounted both on the inside between the yoke 46 and roller shell 47 and also on the outside, as in the case of the solid rollers according to FIGS. 1 to 3.

As shown in FIG. 6, the chambers 14, 15, 16 are secured in groups on the fixed yoke 46, in the case of a heat exchange apparatus mounted inside the roller. Central bores 48 for the fluid intake and central bores 49 for the fluid discharge are provided in the fixed yoke 46. Branching off from these central bores 48, 49 are the fluid inlet ducts 19, 20 leading to the individual chambers, and the outlet ducts 12, 23 leading back from the chambers. The chambers may be provided with inlet or outlet ducts either individually or in groups.

Figure 7:
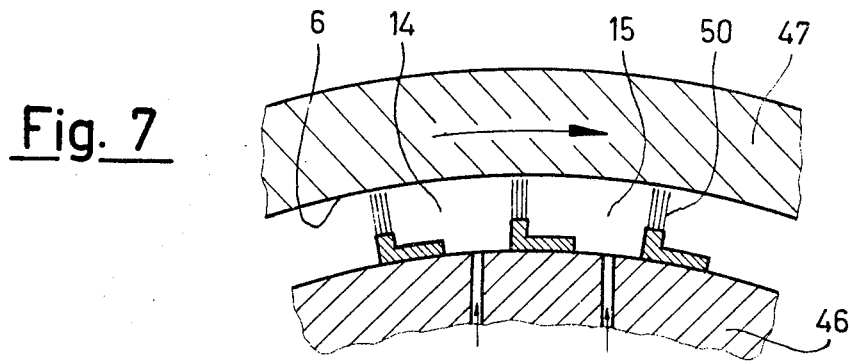
FIG. 7 shows an enlarged detail of the portion of a deflection-compensating roller shown on the right in FIG. 6, with exemplary heat exchange apparatus inside the roller.

As shown in FIG. 7, in the case of chambers acting inside a deflection-compression roller, the walls of these chambers may be formed by brush-like strips 50. In conjunction with the support members 51 provided in deflection-compensating rollers according to FIG. 6, the renewal of the hydrodynamic film of pressure medium which forms on the inside of the roller shell during operation can be made particularly effective.

Figure 8:
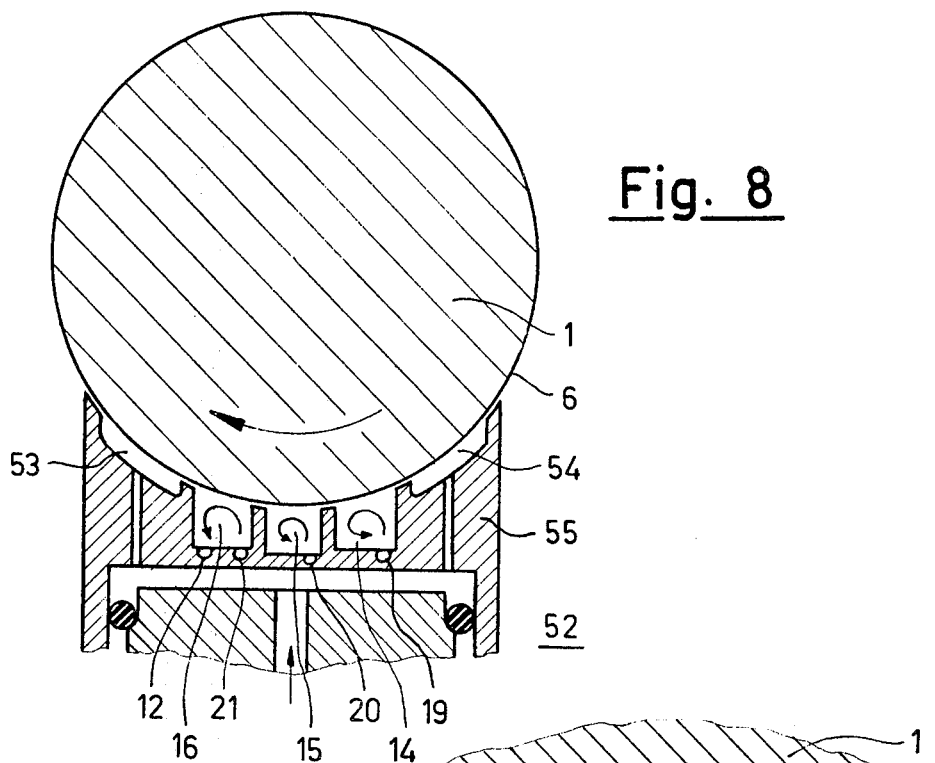
FIG. 8 shows a cross section through a roller with an outer support member, which is provided with an exemplary embodiment of the heat exchange apparatus according to the invention.
Figure 9:
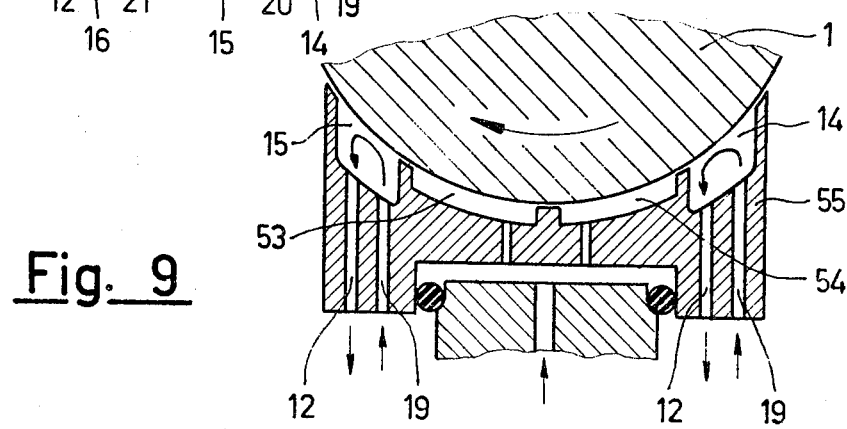
FIG. 9 shows another embodiment of the heat exchange apparatus according to the invention in a roller with an external support member.

As shown in FIGS. 8 and 9, the chambers 14, 15, 16 can also be provided when there is an external support member 52. This external support member 52 then consists of a support member formed by the hydrostatic bearing pockets 53, 54 and a heat exchange apparatus formed by the chambers 14, 15, 16, and these, member and apparatus may be connected to the same or different fluid sources. The chambers 14, 15, 16 located in the shoe 53 of the support member 52 are fed through inlet ducts 19, 20, 21. The fluid is conveyed away again through the outler duct 12.

Figure 10:
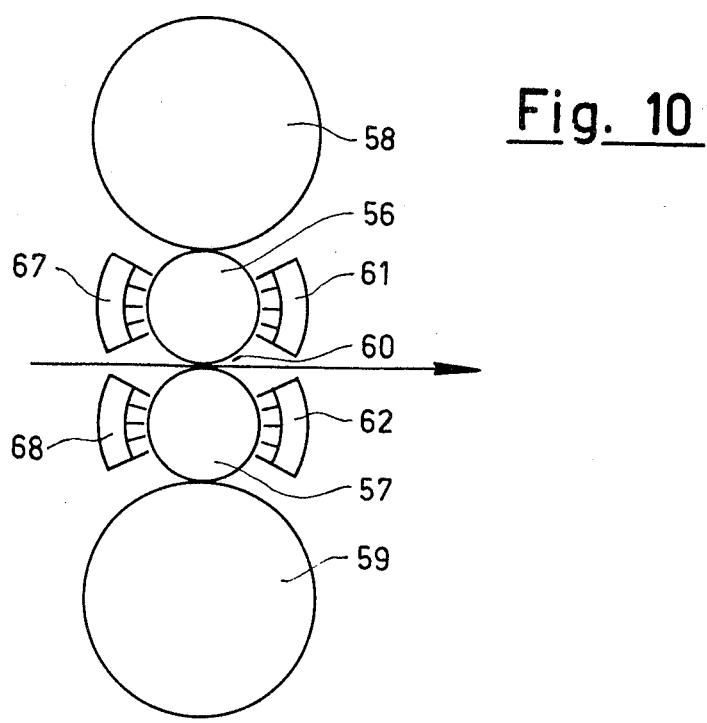
FIGS. 10 and 11 show examples of the use of rollers with heat exchange apparatus according to the invention, in roller stands.
Figure 11:
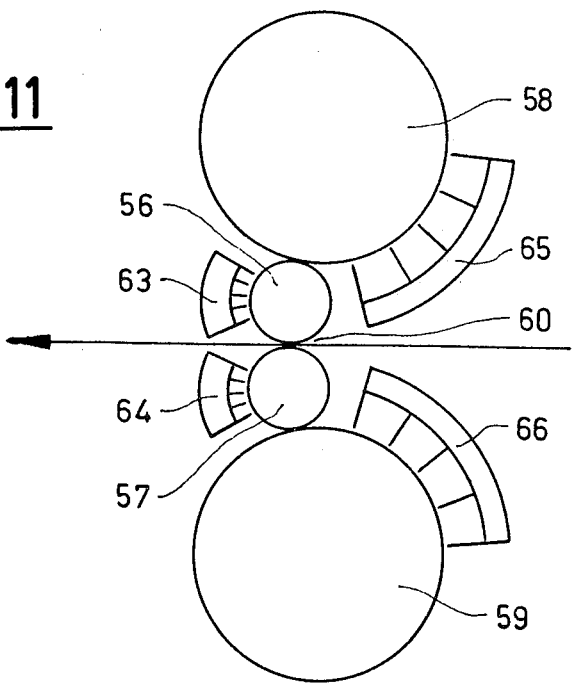

FIGS. 10 and 11 show examples of roller stands comprising rollers with the heat exchange apparatus according to the invention. Each of the roller stands shown consists of two working rollers 56 and 57 acting on the rolling path and two support rollers 58 and 59 which support the working rollers 56 and 57 respectively.

Preferably, a heat exchange apparatus used as a cooling means can be used on that part of the roller surface 6 which has just passed through the roller gap. This is because, in this region of the roller surface 6, the heat generated in the roller gap 60 is more or less at the surface. The heat can therefore be removed more efficiently from these parts of the roller surface. In the examples of roller stands shown, the heat exchange apparatus 61 and 62 in FIG. 10 and the heat exchange apparatus 63 and 64 in FIG. 11 can remove the majority of the heat which is to be eliminated. As shown in FIG. 11, other heat exchange apparatus 65 and 66 can be provided on the support rollers for cooling purposes.

If, on the other hand, when the roller surface is to be heated, the heat exchange apparatus in FIG. 10, for example, should preferably be provided at the points 67 and 68.

We claim:

1. A roller having a surface which is to be heated or cooled by means of a fluid and equipped with heat exchange apparatus comprising at least one chamber for said fluid which is adjacent and opens toward said surface and has a substantially square internal cross section in a plane transverse to the roller axis; chamber walls which coact with said roller surface to form a fluid gap; means clamping the chamber in the circumferential direction of the roller; an inlet duct having a mouth through which said fluid is introduced into the chamber and which duct is sized to cause the inflowing fluid to experience a pressure drop of less than 5 bar; and a fluid outlet duct located behind the mouth of the inlet duct in the direction of movement of the roller surface and through which fluid leaves the chamber, the combination of said chamber cross section and relative duct orientation serving to create turbulence in the fluid within the chamber and the heat exchange apparatus serving to limit the pressure in the chamber to less than 5 bar.

2. A roller as defined in claim 1 in which said wall surfaces are formed to be supported on the roller surface via an intervening hydrodynamic film of lubricant during rotation of the roller.

3. A roller as defined in claim 2 in which said wall surfaces comprise hydrodynamically shaped shoes.

4. A roller as defined in claim 3 including prestressed elastic means biasing the chamber radially toward the roller surface.

5. A roller as defined in claim 3 in which the shoes are movable radially relatively to the roller and are biased elastically toward the roller surface.

6. A roller as defined in claim 1 in which the roller surface is highly elastic; and in which clamping means fixes the chamber relative to the roller in both the radial and the circumferential directions.

7. A roller as defined in claim 1 which coacts with a second roller to define a rolling gap for material being rolled; and which includes a suction chamber associated with said roller surface adjacent the material exit end of the rolling gap and which extends parallel with the roller axes, the suction chamber being maintained at a subatmospheric pressure and serving to draw off said fluid from said roller surface and thereby prevent that fluid from soiling rolled material.

8. A roller as defined in claim 1 which includes a second inlet duct for leading gaseous fluid into said chamber.

9. A roller as defined in claim 1 which coacts with a second roller to define a rolling gap for material being rolled; and said chamber is located near the rolling gap.

10. A roller as defined in claim 1 including partitions which divide the chamber into a series of compartments distributed along the axial length of the roller; and in which each compartment has its own fluid inlet duct and fluid outlet means, whereby different axial portions of said roller surface can be subjected to different fluid conditions.

11. A roller as defined in claim 10 in which the compartments are connected by throughflow openings for the fluid which are variable in cross section.

12. A roller as defined in claim 1 which includes a displacement member in the chamber.

13. A roller as defined in claim 12 in which the displacement member comprises a circular recess into which the inlet duct leads and which serves to effect uniform distribution of the incoming fluid in the axial direction of the roller.

14. A roller as defined in claim 1 including a roller shell which rotates about a fixed yoke and has an inside surface which defines said roller surface; and said chamber is secured to the fixed yoke.

15. A roller as defined in claim 14 in which said chamber walls comprise brush-like strips.

16. A roller as defined in claim 1 in which said chamber is formed in a support member which acts on the outer surface of the roller; and in which the support member also contains hydrostatic bearing pockets.

17. A roller as defined in claim 1 which is rotated by drive means; and in which said inlet duct communicates with a supply pump coupled with the drive means.

18. A pair of rollers as defined in claim 1 which are incorporated in a roller stand and define a rolling gap for material being rolled.

19. Four rollers as defined in claim 1 which are incorporated in a roller stand, two of the rollers defining a rolling gap for material being rolled, and the other two rollers serving as support rollers for the first pair.

* * * * *